(12) United States Patent
Phipps et al.

(10) Patent No.: US 12,474,009 B2
(45) Date of Patent: Nov. 18, 2025

(54) APPARATUS FOR TRACKING A PIG

(71) Applicant: Cokebusters Limited, Chester (GB)

(72) Inventors: John Phipps, Chester (GB); Jakub Wnuk, Sztum (PL); Lukasz Kremski, Chester (GB)

(73) Assignee: Cokebusters Limited, Chester (GB)

( * ) Notice: Subject to any disclaimer, the term of this patent is extended or adjusted under 35 U.S.C. 154(b) by 180 days.

(21) Appl. No.: 18/271,630

(22) PCT Filed: Jan. 18, 2022

(86) PCT No.: PCT/GB2022/050135
§ 371 (c)(1),
(2) Date: Jul. 10, 2023

(87) PCT Pub. No.: WO2022/157487
PCT Pub. Date: Jul. 28, 2022

(65) Prior Publication Data
US 2024/0068614 A1   Feb. 29, 2024

(30) Foreign Application Priority Data

Jan. 21, 2021 (GB) ...................................... 2100799

(51) Int. Cl.
*F16L 55/48* (2006.01)
*B08B 9/055* (2006.01)

(52) U.S. Cl.
CPC ............ *F16L 55/48* (2013.01); *B08B 9/0551* (2013.01)

(58) Field of Classification Search
CPC . F16L 55/48; F16L 55/38; F16L 55/46; F16L 55/26; B08B 9/0551; F17D 3/08;
(Continued)

(56) References Cited

U.S. PATENT DOCUMENTS

| | | | |
|---|---|---|---|
| 10,132,823 B2 | 11/2018 | Giunta | |
| 2003/0185100 A1* | 10/2003 | D'Angelo | G01N 29/222 367/82 |

(Continued)

FOREIGN PATENT DOCUMENTS

| | | |
|---|---|---|
| EP | 2902690 | 8/2015 |
| GB | 2462096 | 1/2010 |

OTHER PUBLICATIONS

Patent Cooperation Treaty, International Search Report and Written Opinion of the International Searching Authority issued in International Application No. PCT/GB2022/050135, May 10, 2022, 9 pp.

(Continued)

*Primary Examiner* — Lee E Rodak
*Assistant Examiner* — Zannatul Ferdous
(74) *Attorney, Agent, or Firm* — Fitch, Even, Tabin & Flannery LLP

(57) ABSTRACT

There is provided an apparatus for tracking a pig travelling inside a tubular object. The apparatus includes a sensor arrangement including at least one position sensor configured to detect a passage of the pig travelling inside the tubular object and a tracking device. The tracking device is configured to: process the detected passage of the pig from a run of the pig through the tubular object to determine a travel time of the pig; using the determined travel time, calculate a speed of the pig through the tubular object; and using the calculated pig's speed, perform real-time tracking of the pig's position inside the tubular object in a subsequent run of the pig through the tubular object.

18 Claims, 3 Drawing Sheets

(58) Field of Classification Search
CPC ........ F28D 1/0477; F28D 7/082; F28G 15/08; F28G 1/12
See application file for complete search history.

(56) References Cited

U.S. PATENT DOCUMENTS

| | | | |
|---|---|---|---|
| 2009/0013806 A1* | 1/2009 | Miller | F16L 55/48 73/865.8 |
| 2009/0078411 A1* | 3/2009 | Kenison | E21B 47/107 166/250.03 |
| 2009/0128136 A1 | 5/2009 | Hablizel | |
| 2011/0114119 A1* | 5/2011 | Yang | F16L 55/48 134/8 |
| 2013/0279296 A1 | 10/2013 | Yang | |
| 2019/0170550 A1* | 6/2019 | Sai | G01F 1/66 |
| 2020/0209198 A1* | 7/2020 | Phipps | G01N 29/262 |
| 2021/0227535 A1* | 7/2021 | Li | H04W 72/51 |
| 2021/0301625 A1* | 9/2021 | Ito | G01N 25/18 |
| 2021/0314380 A1* | 10/2021 | Kim | G06T 19/00 |
| 2022/0169290 A1* | 6/2022 | Pfeifer | B61B 12/06 |

OTHER PUBLICATIONS

Intellectual Property Office, Search Report under Section 17 issued in International Application No. GB2100799.2, Jun. 18, 2021, 1 p.

* cited by examiner

APPARATUS FOR TRACKING A PIG

CROSS-REFERENCE TO RELATED APPLICATIONS

This application is a U.S. national phase application filed under 35 U.S.C. § 371 of International Application No. PCT/GB2022/050135, filed Jan. 18, 2022, designating the United States, which claims priority from United Kingdom patent application No. GB2100799.2, filed Jan. 21, 2021, both of which are hereby incorporated by reference herein in their entireties.

TECHNICAL FIELD

The invention relates to an apparatus for tracking a pig travelling inside a tubular object, a computer-implemented method of tracking a pig travelling inside a tubular object and a computer program. The invention is preferably for use with tubular objects in the form of pipes, pipelines, tubes and tubing. Such tubular objects may come in a variety of shapes, such as straight, bent, serpentine and meandering.

BACKGROUND

Tubing systems in refining furnaces, boilers, fired heaters and the like typically have a sinusoidal path to optimise the exposure of the contents of the tubing systems to heat. Such a sinusoidal path is frequently referred to as being serpentine. In a typical tubing system, a product to be treated usually passes through the tubing system that has horizontally and/or vertically set tubes, and the passage of the product through the tubing system may be in a horizontal direction, a downward direction, an upward direction, or a combination thereof. Some tubing systems may include a section of closely packed tubes that may be used to, for example, raise a temperature of the product to be treated by way of convection heating. The pre-heated product may then be passed to a subsequent section of the tubing system in which there is more space between the tubes, and such tubes may be heated by way of radiant heating. Typically, in both sections, the tubing system includes straight tube sections joined by bent tube sections, which may be semi-circular (also known as U-bends) or may be box headers with sharp bends in the form of 90 degree turns, sometimes referred to as "horseshoes" and/or "mule ears". Other tubing systems may include at least one helical coiled tube or at least one arbour coiled tube.

The term "pig" is used to refer to devices that are passed through a pipe or tubing whether for cleaning purposes or for monitoring the condition of the pipe or tubing. Pigs may be used for aiding separation of product from the pipe or tubing, in particular material buildup on interior walls of the pipe or tubing, for fluid transport separation, etc.

Pigs may be used to inspect, detect and record conditions of a pipe or tubing from the inside to check the surface conditions of the interior and/or exterior of the pipe or tubing, to check for material deposits on the interior and/or exterior walls of the pipe or tubing and to check for degradation and irregularities in the pipe or tubing. This is important because, if a pipe or tubing is blocked, breached or has a compromised structural integrity during its operation, it could not only lead to costly and disruptive unscheduled downtime but also result in life threatening conditions for nearby people.

In addition it is known to wrap or encase pipelines in insulation material. Carrying out inspection of such pipelines from the inside may avoid costly time and effort in removing the insulation material for the purpose of exposing the pipeline's outer surface.

In order for efficient and safe operation of a tubing system, it is important that the tubing system is not only periodically cleaned and free from deposits, but also inspected to ensure the walls of the tubing system are free from undesirable deposits, tube material condition anomalies, wall thinning and/or various forms of metallurgical degradation. Inspection of a pipe or tubing may be performed to assess the need for cleaning and/or repair or to assess the effectiveness of previous cleaning and/or repair.

Conventionally inspections of a pipe or tubing have been performed online through viewing windows and/or by inspecting the pipe manually during shutdown of the pipe or tubing. Monitoring of the condition of a pipe or tubing have also been conventionally carried out by radiography, precision monitoring of flow and pressure, thermal imaging, and hand-held non-destructive testing (NDT) such as ultrasonic testing (UT). However, each of these techniques is limited in its usefulness and has its disadvantages. Manual NDT can be time consuming, for example taking 6-7 days fully to inspect an entire furnace, and also requires abrasive cleaning of the outer wall of the tubing system of the furnace in order to enable successful inspection. Furthermore, a furnace would normally need internal scaffolding to enable the inspection to be carried out, thus wasting time. Thermal imaging usually involves searching for hotspots as an indication of contamination, but is not suitable for inspecting closely packed tubes such as seen in convection heating sections. When monitoring is carried out whilst the furnace is in operation, some areas of the tubing system may not be visible through the viewing windows. Furthermore, the far side of the tubing system is either difficult or impossible to monitor using the conventional monitoring techniques. Accordingly it may be necessary to replace one or more sections of the tubing system according to a supplier-provided lifetime warranty, which can result in not only unnecessary replacement of tube sections but also unnecessary and costly downtime of the tubing system.

It is known to provide a tethered pig with monitoring equipment and to send it through a pipe. Operation of the equipment is controlled from outside the pipe via a cable. Responses detected by the on-board monitoring equipment are transmitted back along the cable to an external monitoring unit.

SUMMARY

According to a first aspect of the invention, there is provided an apparatus for tracking a pig travelling inside a tubular object, the apparatus comprising:
  a sensor arrangement including at least one position sensor configured to detect a passage of the pig travelling inside the tubular object; and
  a tracking device configured to:
    process the detected passage of the pig from a run of the pig through the tubular object to determine a travel time of the pig;
    using the determined travel time, calculate a speed of the pig through the tubular object; and
    using the calculated pig's speed, perform real-time tracking of the pig's position inside the tubular object in a subsequent run of the pig through the tubular object.

The configuration of the apparatus of the invention enables the automatic real-time tracking of the pig travelling inside the tubular object by using the calculated pig's speed from a previous run to estimate the position of the travelling pig inside the tubular object at any given time in a subsequent run, using a minimal number of sensors. This not only minimises or removes the need for a manual search of the tubular object if the pig gets stuck but also obviates the need for the pig to be tracked by a complex system of sensors that can be intrusive, expensive and difficult to install. This is especially critical for tubular objects in dangerous or inaccessible locations.

The real-time tracking ability of the invention improves the efficiency of the pigging or inspection operation by enabling a reliable and accurate determination of the pig's position inside the tubular object. If the pig becomes stuck inside the tubular object, the ability to rapidly identify the stuck pig's position permits its recovery in a timely manner to minimise operational downtime. Furthermore, the ability to track the pig's position in real-time allows control over the pig's movement so as to concentrate on certain areas of the tubular object. For example, the pig may be controlled to move back and forth in areas with increased contamination/fouling levels, thus increasing the efficiency of a decoking process.

The configuration of the apparatus of the invention therefore provides an apparatus with the capacity to learn from one or more previous runs of the pig inside the tubular object to provide more accurate and reliable tracking of the pig inside the tubular object in one or more future runs.

The invention is applicable to various configurations of the tubular object. As stated above, the invention is preferably for use with tubular objects in the form of pipes, pipelines, tubes and tubing, and such tubular objects may come in a variety of shapes, such as straight, bent, serpentine and meandering. For example, the invention may be applied to closed-loop furnaces that feature end-to-end serpentine coils of tubing or pipework, and/or may be applied to pipelines with restricted access due to, for example, their installation on overhead structures (e.g. overhead gantries), underground or under water bodies such as a river, a lake or a water course.

The invention is applicable to various applications of the tubular object, such as pigging, cleaning and inspection.

Preferably the run is the current or most recent run of the pig through the tubular object. Alternatively the run may be any other previous run that is not the current or most recent run of the pig through the tubular object.

In a preferred embodiment of the invention, the tracking device may be configured to use a newer calculated pig's speed to replace an older calculated pig's speed and, using the newer calculated pig's speed, perform the real-time tracking of the pig's position inside the tubular object in the subsequent run of the pig through the tubular object.

Since the pig's speed through the tubular object may change over time due to various factors, the estimation of the pig's position inside the tubular object in the or each subsequent run may become less accurate if it solely relies on the previous calculated pig's speed. For example, as contamination levels inside the tubular object decrease, the pig's speed through the tubular object may increase. Continual adjustment of the calculated pig's speed enables updating of the real-time tracking of the pig's position inside the tubular object to take into account changes in operating conditions with time, thus further enhancing the learning capacity of the apparatus of the invention.

In embodiments of the invention, the tracking device may be configured to process the detected passages of the pig from multiple runs of the pig through the tubular object to determine the travel times of the pig and, using the determined travel times, calculate the speed of the pig through the tubular object. Calculating the pig's speed through the tubular object using the determined travel times from multiple runs may improve the learning ability of the apparatus of the invention to increase the accuracy of the estimation of the pig's position inside the tubular object.

Preferably the tracking device is configured to process the detected passages of the pig from multiple runs of the pig through the tubular object to determine the travel times of the pig and, using the determined travel times, calculate an average speed of the pig through the tubular object. Calculating the pig's average speed through the tubular object in this manner reduces the influence of detection errors or abnormal runs. An abnormal run is a run in which the pigging or inspection operation deviates significantly from the normal pigging or inspection operation, which may arise due to user or operator error or unexpected operating conditions.

More preferably the tracking device is configured to process the detected passages of the pig from multiple runs of the pig through the tubular object to determine the travel times of the pig and, using the determined travel times, calculate a weighted average speed of the pig through the tubular object. Calculating the pig's weighted average speed through the tubular object in this manner allows more weight to be placed on a newer run and less weight to be placed on an older run. This is because, for certain pigging or inspection operations, the tubular object's operating conditions will tend to resemble the tubular object's operating conditions in the newer run over the tubular object's operating conditions in the older run.

Optionally the tracking device may be configured to exclude at least one of the travel times in calculating the speed of the pig through the tubular object if the or each excluded travel time deviates by a predefined amount from a reference travel time. Preferably the reference travel time is the newest travel time of the determined travel times. This allows removal of the influence of one or more abnormal runs over the calculation of the pig's speed through the tubular object.

In further embodiments of the invention, the sensor arrangement may include at least one pressure sensor for measuring a pressure parameter of the interior of the tubular object. The tracking device may be configured to, using the calculated pig's speed and the or each measured pressure parameter, perform the real-time tracking of the pig's position inside the tubular object in the subsequent run of the pig through the tubular object.

In still further embodiments of the invention, the sensor arrangement may include at least one flow sensor for measuring at least one flow parameter of the interior of the tubular object. The tracking device may be configured to, using the calculated pig's speed and the or each measured flow parameter, perform the real-time tracking of the pig's position inside the tubular object in the subsequent run of the pig through the tubular object.

As the pig travels inside the tubular object, changes in pressure and/or flow may take place. This may be due to, for example, the pig transitioning between sections of the tubular object of different shapes and/or sizes or due to the pig approaching a bend or end section of the tubular object. Hence, the pressure and/or flow measurements may be used to aid the real-time tracking of the pig's position inside the tubular object.

Optionally the apparatus may include a display device. The display device may be configured to display an image of the real-time tracking of the pig's position inside the tubular object. The display device may be a display screen, a touchscreen, a television, a monitor, a projector or a beamer. The display device may form part of an electronic or computing device. The display device may form part of, or may be separate from, the tracking device. In such embodiments, the image may include a dynamic graphic of the pig (such as an icon that represents the pig) overlaid on a static graphic of the tubular object (such as a graphical layout of the tubular object).

The visualisation of the real-time tracking of the pig's position inside the tubular object makes it easier for a user or operator to observe the real-time tracking while carrying out other tasks, such as controlling equipment for the pigging or inspection operation.

The apparatus of the invention may include a propulsion device configured to automatically propel the pig inside the tubular object in response to information obtained or derived from the real-time tracking of the pig's position inside the tubular object. The apparatus of the invention may include a controller for controlling the propulsion device. The controller may be, for example, the tracking device.

The obtained or derived information may provide insight into an interior condition of the tubular object. When such information is obtained or derived, the propulsion device may act to automatically change a speed or direction of the pig inside the tubular object and/or may act to automatically drive the pig to move back and forth inside a particular section of the tubular object.

Configuration of the apparatus of the invention in this manner enables certain levels of automation through which data from the real-time tracking of the pig's position inside the tubular object is used to automatically control the propulsion device in driving a movement (e.g. speed, direction) of the pig inside the tubular object.

The propulsion device is preferably a fluid propulsion device for propelling the pig inside the tubular object using fluid pressure, but in other embodiments may be any other device that is capable of propelling the pig inside the tubular object, such as an on-board motor.

In embodiments of the invention, the tracking device may be configured to process at least one physical parameter of the tubular object and the determined travel time of the pig to calculate the speed of the pig through the tubular object. The or each physical parameter of the tubular object may be selected from any one of, but is not limited to:
- a diameter of the tubular object;
- a length of the tubular object;
- a quantity of tubular sections of the tubular object;
- a shape of a bend section of the tubular object;
- a dimension or size of a bend section of the tubular object;
- a location of the or each position sensor;
- a start position of a run of the pig through the tubular object;
- an end position of a run of the pig through the tubular object.

The location(s) and number of position sensors of the sensor arrangement may vary depending on various requirements of the apparatus (such as ease of sensor installation, measurement accuracy, measurement reliability, etc).

In embodiments of the invention, the sensor arrangement may include at least two position sensors, each position sensor corresponding to a respective location inside the tubular object, each position sensor configured to be capable of detecting the passage of the pig at the respective location inside the tubular object. For example, the sensor arrangement may include first and second position sensors, the first position sensor arranged at or adjacent a first tubular end of the tubular object, the second position sensor arranged at or adjacent a second tubular end of the tubular object.

It will be understood that the sensor arrangement may include one or more further position sensors (e.g. a third position sensor, a fourth position sensor, a fifth position sensor and so on) that may be arranged at other locations along the tubular object. The inclusion of the or each further position sensor is particularly useful for obtaining additional tracking information about the pig's position inside a tubular object having a complex shape, such as serpentine tubular objects, which in turn can be used to provide more accurate real-time tracking of the pig's position inside the tubular object in a subsequent run of the pig through the tubular object.

The apparatus may include at least one pig launcher arranged at either or both of tubular ends of the tubular object, the sensor arrangement including at least one position sensor arranged at or adjacent the or each pig launcher to detect a launch of the pig from the or each pig launcher. In such embodiments, the tracking device may be configured to initiate the real-time tracking of the pig's position inside the tubular object upon detection of the launch of the pig from the or each pig launcher.

The apparatus may include at least one pig receiver arranged at either or both of tubular ends of the tubular object, the sensor arrangement including at least one position sensor arranged at or adjacent the or each pig receiver to detect a receipt of the pig by the or each pig receiver.

Using the or each position sensor in this manner provides information about the timing of the launch or receipt of the pig, which can be used by the tracking device to determine a travel time of the pig between separate locations inside the tubular object. In addition, the accuracy of the real-time tracking of the pig's position inside the tubular object is improved by initiating the real-time tracking upon detection of the launch of the pig from the or each pig launcher.

Optionally the sensor arrangement may be configured to be in wireless communication with the tracking device. This enables remote collection of the detected passage of the pig and thereby permits remote tracking of the pig's position inside the tubular object. This is not only beneficial for monitoring a pig travelling inside a tubular object in a dangerous or inaccessible location but also provides a user or operator with ready access to the real-time tracking information from a chosen location, such as a control room where the operator is required to control equipment for the pigging or inspection operation.

The wireless communication may be carried out using wide area network (WAN), Bluetooth™ or Wi-Fi equipment. It will be appreciated that, in other embodiments of the invention, the sensor arrangement may be alternatively or additionally configured to be in wired communication with the tracking device.

Further optionally the apparatus may include a data recordal device configured to record data about the pig's travel inside the tubular object. This enables automatic generation of log sheets with details about the pig's travel through the tubular object, e.g. quantity of runs, duration of runs, operating parameters, etc. As a result, the user or operator would not be required to manually input the data into a log sheet.

The tracking device may include a processor and memory including computer program code, the memory and computer program code configured to, with the processor, enable the tracking device at least to:

process the detected passage of the pig from the run of the pig through the tubular object to determine a travel time of the pig;

using the determined travel time, calculate the speed of the pig through the tubular object; and using the calculated pig's speed, perform the real-time tracking of the pig's position inside the tubular object in the subsequent run of the pig through the tubular object.

The tracking device may be, may include, may communicate with or may form part of one or more of an electronic device, a portable electronic device, a portable telecommunications device, a microprocessor, a mobile phone, a personal digital assistant, a tablet, a phablet, a desktop computer, a laptop computer, a server, a cloud computing network, a smartphone, a smartwatch, smart eyewear, and a module for one or more of the same.

According to a second aspect of the invention, there is provided a computer-implemented method of tracking a pig travelling inside a tubular object, the computer-implemented method comprising the steps of:

receiving a detected passage of the pig travelling inside the tubular object from a run of the pig through the tubular object;

processing the detected passage of the pig to determine a travel time of the pig;

processing the determined travel time to calculate a speed of the pig through the tubular object; and using the calculated pig's speed, perform real-time tracking of the pig's position inside the tubular object in a subsequent run of the pig through the tubular object.

The features and advantages of the first aspect of the invention and its embodiments apply mutatis mutandis to the features and advantages of the computer-implemented method of the second aspect of the invention and its embodiments.

According to a third aspect of the invention, there is provided a computer program comprising computer code configured to perform the computer-implemented method of any one of the second aspect of the invention and its embodiments.

The features and advantages of the first and second aspects of the invention and their embodiments apply mutatis mutandis to the features and advantages of the computer program of the third aspect of the invention and its embodiments.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the invention will now be described, by way of non-limiting examples, with reference to the accompanying drawings in which.

Figure 1:
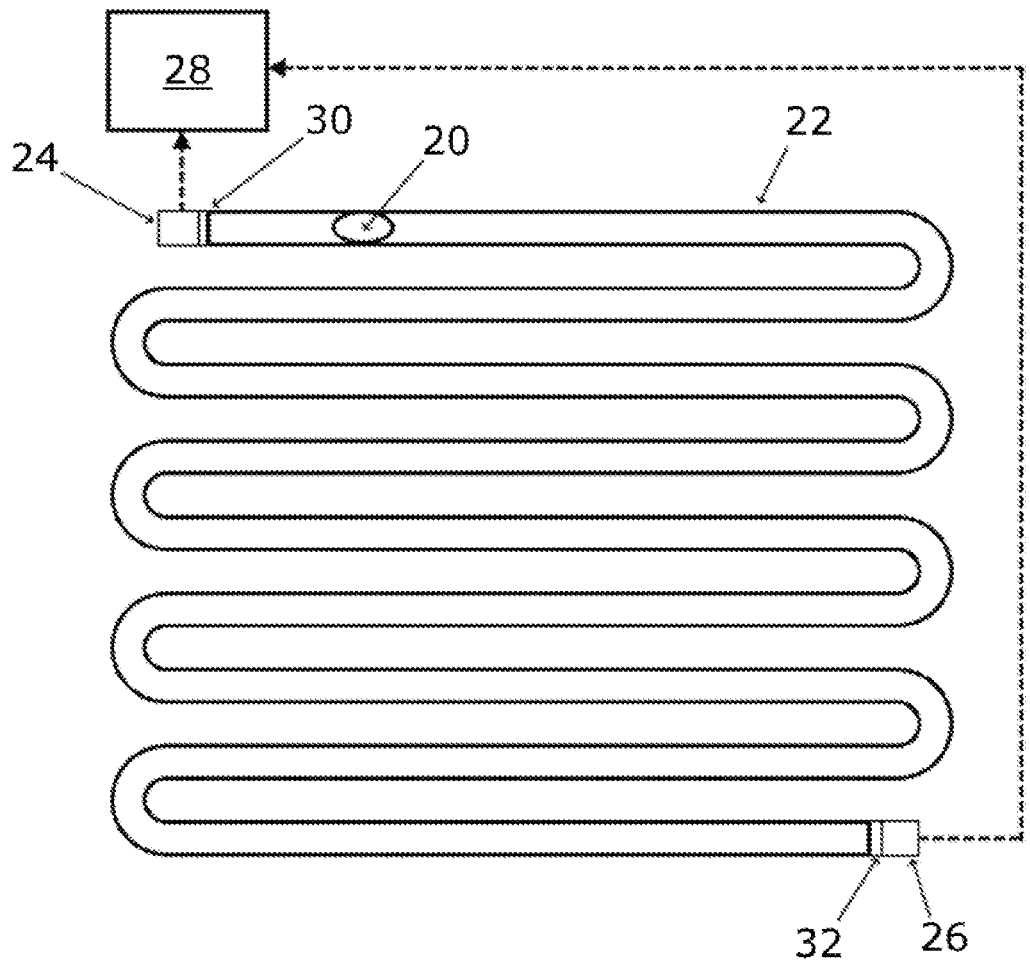
FIG. 1 shows an apparatus according to an embodiment of the invention.

The figures are not necessarily to scale, and certain features and certain views of the figures may be shown exaggerated in scale or in schematic form in the interests of clarity and conciseness.

DETAILED DESCRIPTION

The following embodiments of the invention are described with reference to their use in cleaning of tubes and tubing, such as fired heater, furnace or boiler process tubes, but it will be appreciated that the following embodiments of the invention may also be used in other pigging and inspection operations and other tubular objects, such as pipes and pipelines.

During a decoking or "pigging" operation, it is beneficial to monitor the real-time location of a pig inside a heater tube for several reasons.

The interior of the heater tube may be more heavily contaminated in one particular section. Consequently it may be desirable to operate the pig to move back and forth inside the particular section to remove the heavy contamination. This requires an operator to know the location of the pig inside the heater tube.

The pig may become stuck if it enters a section of the heater tube with reduced internal diameter, which may be caused by internal fouling, use of an oversized pig or a change in tube internal diameter. If a pig becomes stuck, it is sometimes necessary to place a heat mat around the section of the tube where the pig is located. The purpose of the heat mat is to heat up and melt the pig, thereby allowing it to be flushed out. Knowing the location of the pig inside the heater tube is critical to ensure correct placement of the heat map.

During the pigging operation, a pig's movement may become temporarily restricted due to, for example, internal fouling or another anomaly. It would be beneficial for the operator to know if the pig is moving or has stopped so that they can take remedial action, such as increasing fluid pressure (e.g. water pressure), to keep the pig moving.

Pressure and flow sensors may be utilised to respectively measure pressure and flow parameters of the interior of the heater tube. An operator has access to the measured pressure and flow parameters in the form of continuous line charts.

When a pig traverses a return bend or plug header, a slight increase in pressure will be observed. Therefore, as the pig travels through the heater tube, a pressure line chart may appear as a series of "beats", with each spike being associated with a bend. Normally, by physically counting these spikes, the operator can assess an estimated location of the pig within the heater tube according to the number of bends that has been passed by the pig. However, a number of mechanical variables (e.g. pig size, bend size, bend type, damping effect from connection hoses) may prevent one or more of the expected pressure spikes from occurring, thus resulting in an incorrect estimation of the pig's location within the heater tube.

Also, the use of a sufficiently small pig may result in a substantially constant pressure as the pig travels through the heater tube due to fluid/flow bypass. As a result, it becomes difficult to determine the position of the pig travelling through the heater tube from the pressure line chart.

Furthermore the pig's speed through the heater tube may change over time. As the interior of the heater tube becomes cleaner, the pig's speed through the heater tube is likely to increase due to the decrease in resistance. If the pig is replaced by another pig of larger diameter, the pig's speed through the heater tube will decrease. If the operating pressure and/or flow parameters change, a corresponding change in the pig's speed will take place.

Figure 2:
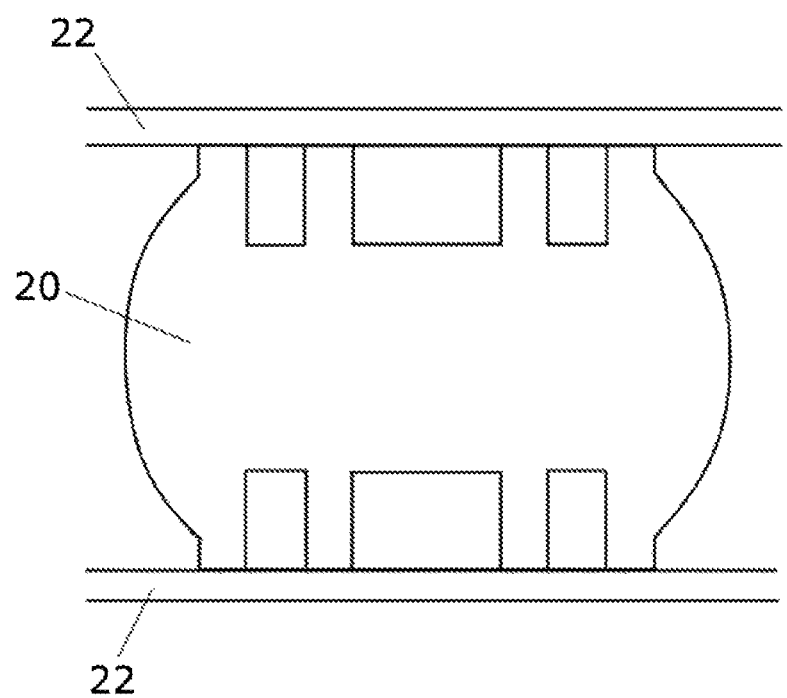
FIG. 2 shows a pig inside a serpentine heater tube.

An apparatus according to an embodiment of the invention is shown in FIG. 1 and is for tracking a scraper pig 20 travelling inside a serpentine heater tube 22. FIG. 2 shows the pig 20 inside the heater tube 22. The apparatus comprises first and second pig launchers 24,26, a sensor arrangement and a tracking device 28.

The first and second pig launchers 24,26 are respectively connected to inlet and outlet ends of the heater tube 22. The pig launchers 24,26 also function as pig receivers. In use, the pig 20 is launched from and received by each pig launcher 24,26. Fluid pressure (e.g. water pressure) by a fluid propulsion device is used to drive the pig 20 through the heater tube 22. Alternatively the pig may be driven by an on-board drive, such as a motor. The pig 20 is preferably driven in both directions through the heater tube 22 but in other embodiments may be driven in only one direction through the heater tube 22.

The sensor arrangement includes a pair of position sensors 30,32. A first position sensor 30 is arranged at the inlet end of the heater tube 22 and adjacent to the first pig launcher 24. A second position sensor 32 is arranged at the outlet end of the heater tube 22 and adjacent to the second pig launcher 26. Each position sensor 30,32 is an electromagnetic pig signaller that is capable of detecting the passage of the pig 20. The pig 20 is fitted with a magnet, such as a neodymium rare earth permanent magnet. The magnet is cast inside the pig 20 at the manufacturing stage. It will be appreciated that other types of sensors may be used as position sensors to detect the passage of the pig 20 travelling inside the heater tube 22. It will be further appreciated that one or more further position sensors (e.g. a third position sensor, a fourth position sensor, a fifth position sensor and so on) may be arranged at other locations along the heater tube 22. For example, a pair of position sensors may be arranged at inlet and outlet ends of each section of the heater tube 22 and/or multiple position sensors may be arranged and spaced apart along a length of each section of the heater tube 22.

The tracking device 28 is exemplarily a laptop computer with a display screen. In use, the tracking device 28 is preferably located in a control room where the operator controls equipment for the pigging operation. The tracking device may be any device that includes a processor and memory including computer program code, where the memory and computer program code are configured to, with the processor, enable the tracking device to carry out various processing functions. The tracking device may be, may include, may communicate with or may form part of one or more of an electronic device, a portable electronic device, a portable telecommunications device, a microprocessor, a mobile phone, a personal digital assistant, a tablet, a phablet, a desktop computer, a server, a cloud computing network, a smartphone, a smartwatch, smart eyewear, and a module for one or more of the same. It will be appreciated that references to a memory or a processor may encompass a plurality of memories or processors.

The pig signallers 30,32 are configured to be in wireless communication with the laptop computer 28, which is exemplarily achieved through a low-power wide-area network (WAN) protocol that is capable of linking battery-operated units. A signal from each pig signaller 30,32 is transmitted through an antenna mounted directly to the pig signaller 30,32 and received at a receiver, e.g. a base station, that is connected to the laptop computer 28.

It is envisaged that, in other embodiments of the invention, the wireless communication between the sensor arrangement and the laptop computer 28 may be carried out using Bluetooth™ or Wi-Fi equipment. It is also envisaged that, in still other embodiments of the invention, the sensor arrangement may be configured to be in wired communication with the laptop computer 28 or configured to be in wired and wireless communication with the laptop computer 28.

After the signals are received by the laptop computer 28, the signals are interpreted by a computer program that acts as a serial bus emulator. The information from the pig signallers 30,32 are deciphered and formatted into useable pieces of information that can be recognised and processed by the computer program.

Figure 3:
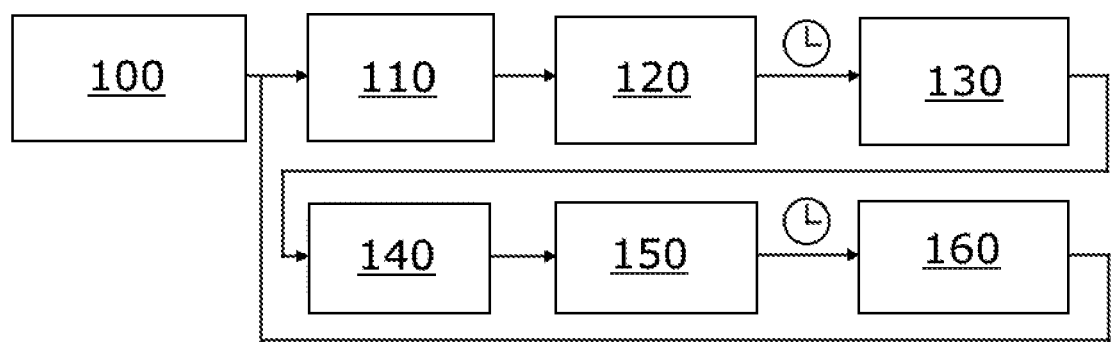
FIG. 3 shows a flow diagram illustrating an operation of the apparatus of FIG. 1.
Figure 4:
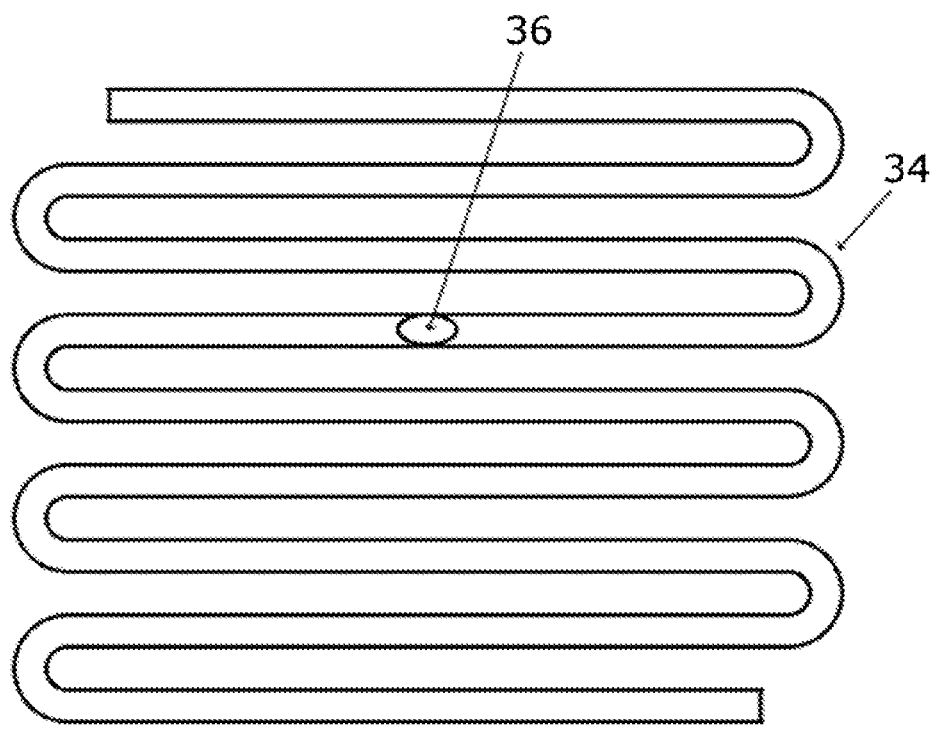
FIG. 4 illustrates real-time tracking of the pig of FIG. 2 inside the serpentine heater tube.

Operation of the apparatus of FIG. 1 during an exemplary run of the pig 20 through the heater tube 22 is described as follows, with reference to FIGS. 3 and 4.

The exemplary run is described with reference to an initial launch of the pig 20 from the first pig launcher 24 but applies mutatis mutandis to an initial launch of the pig 20 from the second pig launcher 26.

Before the run is started, the computer program is provided with physical parameters of the heater tube 22, such as:
  a diameter of the heater tube 22;
  a length of the heater tube 22;
  a quantity of tubular sections of the heater tube 22;
  a shape of each bend section of the heater tube 22;
  a dimension or size of each bend section of the heater tube 22;
  a location of each pig signaller 30,32;
  a start position of a run of the pig 20 through the heater tube 22;
  an end position of a run of the pig 20 through the heater tube 22.

This enables the computer program to not only determine the overall distance travelled by the pig 20 between the inlet and outlet ends of the heater tube 22 but also create a graphical layout 34 of the heater tube 22.

Initially the pig 20 is loaded into the first pig launcher 24 ('100'), and the operator controls the fluid pressure to launch the pig 20 from the first pig launcher 24 ('110').

When the pig 20 is launched from the first pig launcher 24, it will pass the first pig signaller 30 that will detect the magnetic field generated by the magnet in the pig 20 and thereby send a wireless signal to the receiver connected to the laptop computer 28 to confirm the detection of the passage of the pig 20. At this stage the computer program is informed that the pig 20 has passed the first pig signaller 30 and entered the heater tube 22, which triggers the computer program to start a timer ('120'). The pig 20 then travels through the heater tube 22 from the inlet end to the outlet end. When the pig 20 is received by the second pig launcher 26, it will pass the second pig signaller 32 that will detect the magnetic field generated by the magnet in the pig 20 and thereby send a wireless signal to the receiver connected to the laptop computer 28 to confirm the detection of the passage of the pig 20. At this stage the computer program is informed that the pig 20 has passed the second pig signaller 32 and left the heater tube 22, which triggers the computer program to stop the timer ('130').

The laptop computer 28 may be programmed to identify the pig signaller 30,32 from which a given wireless signal originated through evaluation of:

unique identifiers (such as serial numbers) encoded in the wireless signals transmitted by the pig signallers 30,32; and a sequence of the wireless signals transmitted by the pig signallers 30,32. The receipt of a wireless signal from a given pig launcher 24,26 after receiving a wireless signal from the other pig launcher 24,26 indicates that the pig is being received by the corresponding pig launcher 24,26. The receipt of two consecutive wireless signals from a given pig signaller 30,32 indicates that the pig is being launched by the corresponding pig launcher 24,26.

The time difference between the two signals will be determined as the run time (also known as travel time) for the travel of the pig 20 through the heater tube 22. The computer program then calculates the speed of the pig 20 through the heater tube 22 in the previous run from the run time and the distance value between the inlet and outlet ends.

If the pig 20 is then required to be driven in the opposite direction from the second pig launcher 26 to the first pig launcher 24, the operator controls the fluid pressure to launch the pig 20 from the second pig launcher 26 ('140'). When the pig 20 is launched from the second pig launcher 26, it will pass the second pig signaller 32 that will detect the magnetic field generated by the magnet in the pig 20 and thereby send a wireless signal to the receiver connected to the laptop computer 28 to confirm the detection of the passage of the pig 20. At this stage the computer program is informed that the pig 20 has passed the second pig signaller 32 and entered the heater tube 22 and initiates the real-time tracking of the pig's position inside the heater tube 22 ('150'). The display screen of the laptop computer 28 displays a moving icon 36 representing the pig 20 overlaid on the graphical layout 34 of the heater tube 22, as shown in FIG. 4. As the actual pig 20 travels through the heater tube 22 from the outlet end to the inlet end, the virtual pig signified by the icon 36 moves along the graphical layout 34 of the heater tube at a speed equal to the calculated pig's speed from the previous run. This provides the operator with an approximate location of the pig 20 inside the heater tube 22 at any given time. When the pig 20 is received by the first pig launcher 24, it will pass the first pig signaller 30 that will detect the magnetic field generated by the magnet in the pig 20 and thereby send a wireless signal to the receiver connected to the laptop computer 28 to confirm the detection of the passage of the pig 20. At this stage the computer program is informed that the pig 20 has passed the first pig signaller 30 and left the heater tube 22 and stops the real-time tracking of the pig's position inside the heater tube 22 ('160'). During the second run, the detected passages of the pig 20 may be recorded and used to determine the run time and calculate the pig's speed in the same way as the first run.

The laptop computer 28 is preferably programmed to record the data about the pig's travel inside the heater tube 22 and automatically generate log sheets with details about the pig's travel through the heater tube 22, e.g. quantity of runs, duration of runs, operating parameters, etc.

The calculated pig's speed can also be used for the real-time tracking of the pig's position inside the heater 22 in a new run that is in the same direction as the previous run.

By way of the real-time tracking of the pig's position providing the operator with the pig's approximate location inside the heater tube 22 at any given time, the operator is provided with information that enables them to control the decoking operation, e.g. maintain or change the movement (e.g. speed, direction) of the pig 20 through the heater tube, drive the pig 20 to move back and forth inside a particular section of the heater tube 22, or change fluid pressure direction to re-launch the pig 20 after it is received in a pig launcher 24,26.

Data from the real-time tracking of the pig's position inside the heater tube 22 may be used to automatically control the movement of the pig 20 inside the heater tube 22. In this regard, operator involvement is minimal or optional. The fluid propulsion device is exemplarily configured to automatically control a propulsion of the pig 20 inside the heater tube 22 in response to information obtained or derived from the real-time tracking of the pig's position inside the heater tube 22, as follows:

automatically reversing fluid pressure direction to re-launch the pig 20 after it is received in a pig launcher 24,26. As described above, a clear indication is given when a pig arrives at the second pig launcher 26. This indication can be used to automatically activate the fluid propulsion device to reverse the fluid pressure direction to drive the pig 20 out of the second pig launcher 26 towards the first pig launcher 24 through the heater tube 22. Similarly, the arrival of the pig 20 at the first pig launcher 24 is accompanied by an indication, which can then be used to automatically activate the fluid propulsion device to once again reverse the fluid pressure direction to drive the pig 20 out of the first pig launcher 24 towards the second pig launcher 26 through the heater tube 22;

automatically increasing or decreasing the fluid pressure to change the speed of the pig 20 inside the heater tube 22; and/or automatically controlling the fluid pressure direction to change the direction of the pig 20, such as driving the pig 20 to move back and forth inside a particular section of the heater tube 22.

The automatic activation of the fluid propulsion device may be carried out by linking the controls of the fluid propulsion device to the tracking device 28, which then acts as a controller to control the activation of the fluid propulsion device.

The automatic control of the fluid propulsion device can be maintained without operator involvement until such time as, for example, the pig 20 needs to be replaced by a different pig, e.g. a newer pig, a sharper pig, a larger diameter pig.

Two exemplary modes of the real-time tracking of the pig's position inside the heater tube 22 are described as follows:

In a first exemplary mode, the real-time tracking of the pig's position inside the heater tube 22 is carried out using a calculated pig's speed from a previous run. The calculated pig's speed is kept unchanged until it is deemed necessary to recalculate the pig's speed through the heater tube 22. The recalculation of the pig's speed through the heater tube 22 may be carried out as a result of an operator decision or may be automatically carried out after a fixed number of runs are completed.

After recalculating the pig's speed through the heater tube 22, the newer calculated pig's speed replaces the older calculated pig's speed and is used in the real-time tracking of the pig's position inside the heater tube 22 in the or each subsequent run of the pig 20 until it is deemed necessary to recalculate the pig's speed through the heater tube 22.

In a second exemplary mode, the real-time tracking of the pig's position inside the heater tube 22 is carried out using a calculated pig's speed from multiple previous runs to reduce the influence of detection errors or abnormal runs. The computer program calculates the pig's speed from a fixed number of multiple previous runs by taking the determined run times from the previous runs and assigning a pre-defined weight to each run time, as shown in Table 1.

TABLE 1

| Run | Time (seconds) | Weighting | Result (seconds) |
|---|---|---|---|
| 4 | 88.56 | 10% | 8.85 |
| 3 | 87.80 | 20% | 17.56 |
| 2 | 86.54 | 30% | 25.96 |
| 1 (Previous run) | 85.90 | 40% | 34.36 |
| Calculated run time (seconds) | | | 86.74 |

The second exemplary mode continually recalculates the calculated pig's speed after each completed run and thereby enables the automatic adjustment of the real-time tracking of the pig's position inside the heater tube 22 to take into account changes in operating conditions with time.

Optionally the computer program may exclude at least one of the run times in calculating the speed of the pig 20 through the heater tube 22 if the or each excluded run time deviates by a predefined amount from a reference run time, which may be the most recent run of the multiple runs. This allows removal of the influence of one or more abnormal runs over the calculation of the pig's speed through the heater tube 22.

Alternatively the pig's speed through the heater tube 22 may be an unweighted average speed of the previous multiple runs, instead of a weighted average speed of the previous multiple runs.

The number of previous multiple runs may be two, three, four or more.

As the pig 20 travels inside the heater tube 22, changes in pressure and/or flow may take place due to, for example, the pig transitioning between sections of the heater tube 22 of different shapes and/or sizes or due to the pig approaching a bend or end section of the heater tube 22.

The pressure and/or flow changes may be used to aid the real-time tracking of the pig's position inside the heater tube 22. When the pig 20 enters the heater tube 22 from a launcher 24,26 as detected by a pig signaller 30,32, the computer program will monitor the pressure and flow parameters of the interior of the heater tube 22 via pressure and flow sensors in addition to detection of the passage of the pig 20 inside the heater tube 22 using the pig signallers 30,32 and any other optional position sensor arranged along the heater tube 22 between the pig signallers 30,32. For example, a significant increase or decrease in pressure and flow indicates that the pig has reached an end of the heater tube 22. Also, for example, as mentioned above, as the pig 20 travels through the heater tube 22, a pressure line chart may appear as a series of "beats", with each spike being associated with a bend. The change in pressure and flow parameters will be vastly different depending on the feature of the heater tube 22 towards which the pig 20 is travelling. If the pig 20 is travelling towards a section of the heater tube 22 of reduced size, the computer program will be searching for an increase in pressure and a decrease in flow. If the pig 20 is travelling towards a section of the heater tube 22 of increased size, the computer program will be searching for a decrease in pressure and increase in flow. Additionally the computer program may compare the current pressure and flow parameters with measured pressure and flow parameters from previous runs of the pig 20 through the heater tube 22.

Hence, the pressure and/or flow measurements together with the calculated pig's speed may be used to carry out the real-time tracking of the pig's position inside the heater tube 22. More specifically, the pressure and/or flow data may be combined with the calculated pig's speed by the laptop computer 28 and fed to the display screen to generate the display of the moving icon 36 representing the pig 20 overlaid on the graphical layout 34 of the heater tube 22. Such combination improves the accuracy of the graphical representation of the pig's location, direction and speed inside the heater tube 22.

The pressure and/or flow measurements may be shown on the display screen of the laptop computer 28 together with the graphical display of the real-time tracking of the pig's position inside the heater tube 22. Alternatively the pressure and/or flow measurements may be shown on a separate display screen. In addition the pressure and/or flow measurements may be included in the automatically generated log sheets.

The configuration of the apparatus of FIG. 1 therefore enables the automatic real-time tracking of the pig 20 travelling inside the heater tube 22 by using the determined travel time from a previous run to estimate the position of the travelling pig 20 inside the heater tube 22 at any given time, using a minimal number of sensors. In this way the apparatus of FIG. 1 is capable of learning from experience in that the updating of the run time, the use of a weighted or unweighted average of run times and the ability to exclude one or more anomalous readings provide the apparatus with the capacity to learn from the previous run (or previous runs) of the pig 20 inside the heater tube 20 but also permit such learning to automatically control the propulsion of the pig 20 inside the heater tube 22 and record and report information associated with the run(s).

The invention provides time savings and performance improvements over conventional inline decoking processes, examples of which are set out as follows:

A more accurate understanding of the pig's position within the heater tube 22 to enable timely recovery of the pig 20 to minimise operational downtime;

Real-time tracking of the pig's position to improve the decoking process. For example, the pig 20 may be controlled to move back and forth in areas of the heater tube 22 with increased contamination/fouling levels, thus increasing the efficiency of the decoking process;

Reduction of number of sensors required to monitor the travel of the pig 20 through the heater tube 22, thus reducing sensor arrangement complexity and costs;

Reliable indication of the pig 20 leaving a pig launcher 24,26 into the heater tube 22. This reduces loss in operational time if the pig 20 fails to enter the heater tube 22;

indication of the pig 20 arriving at a pig launcher 24,26 from the heater tube 22. This reduces loss in time spent checking whether the pig 20 has been received by the pig launcher 24,26;

generation of log sheets detailing information about the pig's travel through the heater tube 22, such as quantity of runs, duration of runs, operating parameters etc. This removes the need for manual inputting of the data into a log sheet.

It will be appreciated that the above numerical values are merely intended to help illustrate the working of the invention and may vary depending on the requirements of the apparatus and the associated application.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An apparatus for tracking a pig travelling inside a tubular object, the apparatus comprising:
   a sensor arrangement including at least one position sensor configured to detect a passage of the pig travelling inside the tubular object;
   a tracking device configured to:
      process the detected passage of the pig from a run of the pig through the tubular object to determine a travel time of the pig;
      using the determined travel time, calculate a speed of the pig through the tubular object; and
      using the calculated pig's speed, perform real-time tracking of the pig's position inside the tubular object in a subsequent run of the pig through the tubular object; and
   a propulsion device configured to automatically control a propulsion of the pig inside the tubular object in response to information obtained or derived from the real-time tracking of the pig's position inside the tubular object,
   wherein the propulsion device is a fluid propulsion device for propelling the pig inside the tubular object using fluid pressure.

2. An apparatus according to claim 1 wherein the tracking device is configured to use a newer calculated pig's speed to replace an older calculated pig's speed and, using the newer calculated pig's speed, perform the real-time tracking of the pig's position inside the tubular object in the subsequent run of the pig through the tubular object.

3. An apparatus according to claim 1 wherein the tracking device is configured to process the detected passages of the pig from multiple runs of the pig through the tubular object to determine the travel times of the pig and, using the determined travel times, calculate the speed, an average speed or a weighted average speed of the pig through the tubular object.

4. An apparatus according to claim 3 wherein the tracking device is configured to exclude at least one of the travel times in calculating the speed of the pig through the tubular object if the or each excluded travel time deviates by a predefined amount from a reference travel time.

5. An apparatus according to claim 4 wherein the reference travel time is a newest travel time of the determined travel times.

6. An apparatus according to claim 1 wherein the sensor arrangement includes at least one pressure sensor for measuring a pressure parameter of the interior of the tubular object, and wherein the tracking device is configured to, using the calculated pig's speed and the or each measured pressure parameter, perform the real-time tracking of the pig's position inside the tubular object in the subsequent run of the pig through the tubular object.

7. An apparatus according to claim 1 wherein the sensor arrangement includes at least one flow sensor for measuring a flow parameter of the interior of the tubular object, and wherein the tracking device is configured to, using the calculated pig's speed and the or each measured flow parameter, perform the real-time tracking of the pig's position inside the tubular object in the subsequent run of the pig through the tubular object.

8. An apparatus according to claim 1 including a display device, the tracking device configured to display an image of the real-time tracking of the pig's position inside the tubular object on the display device.

9. An apparatus according to claim 8 wherein the image includes a dynamic graphic of the pig overlaid on a static graphic of the tubular object.

10. An apparatus according to claim 1 wherein the tracking device is configured to process at least one physical parameter of the tubular object and the determined travel time of the pig to calculate the speed of the pig through the tubular object.

11. An apparatus according to claim 10 wherein the or each physical parameter of the tubular object is selected from any one of:
   a diameter of the tubular object;
   a length of the tubular object;
   a quantity of tubular sections of the tubular object;
   a shape of a bend section of the tubular object;
   a dimension or size of a bend section of the tubular object;
   a location of the or each position sensor;
   a start position of a run of the pig through the tubular object;
   an end position of a run of the pig through the tubular object.

12. An apparatus according to claim 1 wherein the sensor arrangement includes at least two position sensors, each position sensor corresponding to a respective location inside the tubular object, each position sensor configured to be capable of detecting the passage of the pig at the respective location inside the tubular object, wherein the sensor arrangement includes first and second position sensors, the first position sensor arranged at or adjacent a first tubular end of the tubular object, the second position sensor arranged at or adjacent a second tubular end of the tubular object.

13. An apparatus according to claim 1 including at least one pig launcher arranged at either or both of tubular ends of the tubular object, the sensor arrangement including at least one position sensor arranged at or adjacent the or each pig launcher to detect a launch of the pig from the or each pig launcher, wherein the tracking device is configured to initiate the real-time tracking of the pig's position inside the tubular object upon detection of the launch of the pig from the or each pig launcher.

14. An apparatus according to claim 1 wherein the sensor arrangement is configured to be in wireless communication with the tracking device.

15. An apparatus according to claim 1 including a data recordal device configured to record data about the pig's travel inside the tubular object.

16. An apparatus according to claim 1 wherein the tracking device includes a processor and memory including computer program code, the memory and computer program code configured to, with the processor, enable the tracking device at least to:
   process the detected passage of the pig from the run of the pig through the tubular object to determine a travel time of the pig;

using the determined travel time, calculate the speed of the pig through the tubular object; and using the calculated pig's speed, perform the real-time tracking of the pig's position inside the tubular object in the subsequent run of the pig through the tubular object.

17. A computer-implemented method of tracking a pig travelling inside a tubular object, the computer-implemented method comprising the steps of:

receiving a detected passage of the pig travelling inside the tubular object from a run of the pig through the tubular object;

processing the detected passage of the pig to determine a travel time of the pig;

processing the determined travel time to calculate a speed of the pig through the tubular object;

using the calculated pig's speed, perform real-time tracking of the pig's position inside the tubular object in a subsequent run of the pig through the tubular object; and automatically controlling a propulsion of the pig inside the tubular object using a propulsion device in response to information obtained or derived from the real-time tracking of the pig's position inside the tubular object, wherein the propulsion device is a fluid propulsion device for propelling the pig inside the tubular object using fluid pressure.

18. A non-transitory computer readable medium comprising computer code configured to perform the computer-implemented method of claim 17.

* * * * *